ved  May 15, 1962

3,034,850
PROCESS OF DYEING WITH VAT DYES

Joseph C. King, Greenville County, S.C., assignor to Metro-Atlantic, Inc., Centerdale, R.I., a corporation of Rhode Island
No Drawing. Filed Mar. 20, 1959, Ser. No. 800,666
7 Claims. (Cl. 8—94)

This invention relates to vat-dye dyeing techniques, particularly to the dyeing of textiles with vat dyes, to oil-in-water emulsions for effecting such dyeings, and to the production of such emulsions.

This invention is applicable to the dyeing of all textiles dyeable with vat dyes, natural as well as synthetic, and blends of both, including, but without limitation, cellulosic fabrics, regenerated cellulosic fabrics, animal fiber fabrics such as silk and wool fabrics, etc., and also to the dyeing of yarns, threads, fibers, etc.

It is among the objects of the present invention to provide a process of dyeing with vat dyes which, for the same shade and intensity of color, permits the utilization of materially less of the relatively expensive vat dye.

It is another object of this invention to provide a vat-dyeing procedure in which the vat dye is applied in such manner as to facilitate its application and the maintenance of the equipment in a clean and operative condition.

It is another object of this invention to provide novel vat dye containing oil-in-water emulsions.

It is still another object of this invention to provide processes for producing such oil-in-water emulsions.

Other objects and advantages of this invention will be apparent from the following detailed description thereof.

In accordance with this invention, vat dyes having an average particle size of from 20 to 100 microns, preferably 60 to 80 microns, are dispersed in an aqueous solution of a water-soluble caseinate or soya bean proteinate or mixture thereof, and the resultant dispersion emulsified with a volatile hydrocarbon oil to produce an emulsion the inner phase of which contains as an essential constituent the volatilizable hydrocarbon oil and the outer phase of which contains the water-soluble caseinate or proteinate or mixture thereof and has dispersed therein the vat dye particles.

Surprisingly, I have found that when such emulsion is applied to textiles or other fibrous material, including yarns, threads, etc., it effects the dyeing with materially less, of the order of about one-half, of the vat dye heretofore required to give substantially the same shade and intensity of color.

While the reason for this unexpected improvement is not fully understood, it is believed due in part at least to the affinity of the fibers for water. The application of the vat dye dispersed in the aqueous phase of the oil-in-water emulsion results in more uniform application and better spread of the dye over the fibers as well as better penetration of the dye into the fibers.

It will be appreciated that the above explanation is given for the purpose of facilitating a better understanding of the invention; the invention, however, is not to be limited to this explanation.

All known vat dyes may be employed in the practice of this invention. Examples of some are given in the examples which follow. In those cases where the vat dyes have an average particle size greater than about 100 microns, they are subjected to attrition or grinding to reduce the particle size so that the average particle size is within the range of 20 to 100 microns, preferably 60 to 80 microns. The amount of vat dye incorporated in the emulsion will, of course, vary with different dyes and will depend on the intensity of the color desired. The optimum amount is readily determined by making a few sample dyeings. In general, from 2% to 20%, preferably about 5%, by weight based on the total weight of the emulsion, of vat dye is dispersed in the aqueous phase of the emulsion.

As the water-soluble casein or soya bean protein compounds, ammonium, borax and alkali metal, such as sodium or potassium caseinates or soya bean proteinates, may be used. The water-soluble caseinate is obtained by reacting casein derived from milk, in the customary manner, with ammonia, an alkali metal salt or borax to produce the water-soluble caseinate. For example, water may be heated to about 60° C., the casein added thereto, the slurry agitated at about 60° C., and thereafter the alkali, such as ammonia or alkali metal salt, added while agitating and maintaining the temperature at about 60° C. to convert the insoluble casein to the soluble caseinate. Thereafter, the resulting solution is cooled to approximately room temperature and a preservative, e.g. Dowicide A (sodium o-phenylphenate), added to produce the caseinate solution employed in making the emulsion. The water-soluble soya bean proteinate solution may be produced in the same manner by substituting soya bean protein derived from soya bean in any well known manner for the casein derived from milk. Preferably, but not necessarily, an aqueous solution containing 15% by weight of water-soluble caseinate or soya bean proteinate, is used in the preparation of the emulsion; other concentrations could, of course, be employed.

The amount of caseinate, proteinate or mixture thereof incorporated in the outer phase of the emulsion, as a 15% solution, is from 0.25% to 15%, preferably from 0.5% to 3%, based on the weight of this outer phase.

The water phase of the oil-in-water emulsion may also contain a lubricant such as glycerin, diethylene glycol, triethylene glycol, or mixtures of such glycols, which provides lubrication and prevents drying on the squeeze rolls when the vat dye containing emulsion is applied to the textile or other material. It may also contain surfactants or dispersing agents and anti-foaming agents. An example of a material having both anti-foaming and surfactant properties is 2-ethylhexanol (iso-octyl-alcohol). The amount of such lubricant employed in the emulsion, based on the total weight of the emulsion, may be from .50% to 2.0%, preferably about .75%. The amount of anti-foaming agent, based on the weight of the total emulsion, may be from .01% to .076%, preferably about .05%.

Best results are obtained with oil-in-water emulsions in which the water phase contains from .075% to 2.25% dry basis, based on the weight of the emulsion, of water-soluble caseinate or soya bean proteinate, or mixture of both, and from 2.4% to 3% dry basis, based on the weight of the emulsion, of sodium alginate, from 0.5% to 2% glycerin, and from 0.1% to 0.5% 2-ethylhexanol. It has been found convenient to produce a concentrate containing the water-soluble caseinate or proteinate, or mixture of both, sodium alginate, glycerin and ethylhexanol in the proportions above indicated and to employ this concentrate in making the emulsion by adding the concentrate to water in the proportions of approximately 1 part of the concentrate per 5 to 20 parts, preferably about 10 parts of water, dispersing the vat dye particles in the resultant water solution, and emulsifyng this disperson with the volatilized hydrocarbon oil to produce the emulsion in which the dispersion of the vat dye particles in the aqueous solution is the outer phase and the hydrocarbon oil is the inner phase. Alternatively, the concentrate may be emulsified with the volatile hydrocarbon oil to produce the emulsion and the vat dye particles added to this emulsion. The preferred procedure, however, is to disperse the vat dye particles in the water solution of the concentrate prior to the incorporation of the hydrocarbon oil to produce the emulsion. By dispersing the vat dye particles in the water solution of the caseinate and/or proteinate and then emulsifying this dispersion with the hydrocarbon oil, more uniform dyeing results as compared with the procedure in which the vat dye particles are added to the emulsion.

The hydrocarbon oil in which the aqueous solution is dispersed to form the oil-in-water emulsion may be any hydrocarbon solvent, aliphatic, aromatic, or a mixture containing both aliphatic and aromatic constituents, boiling within the range of from 100° C. to about 300° C. and having a KB value of from 45 to 55. The KB value is determined as is conventional by determining the point at which a standardized Kauri-Butanol solution at 25° C. becomes cloudy upon addition of the hydrocarbon oil thereto. Suitable hydrocarbon oils are the petroleum fractions sold as mineral spirits, such as Shell Mineral Spirits No. 8181 or Varsol No. 1. The emulsion contains from about 25% to about 45% by weight of the hydrocarbon oil phase and from about 55% to about 75% by weight of the water solution phase containing the vat dye particles dispersed therein.

In the production of the emulsion, an Eppenbach homogenizer, or other equipment of this type, is employed for the preparation of the dispersion of the vat dye in the water-solution of caseinate and/or proteinate containing, if desired, lubricant and anti-foaming agents, and also for the production of the emulsion of this dispersion with the hydrocarbon oil. During this mixing, temperature conditions employed should be of the order of about 50° F. to 110° F., preferably around 80° F. After formation of the dispersion of the vat dye particles in the solution of caseinate and/or proteinate, the hydrocarbon oil is added while agitating to produce an oil-in-water emulsion. It is preferable to add the hydrocarbon oil below the surface of the dispersion, desirably directed at the mixing head or blades of the blender or homogenizer employed to produce the batch.

The oil-in-water emulsion thus produced has a viscosity of from 700 to 3,100 centipoises as determined on a Brookfield viscosimeter, at 25° C., using a No. 2 spindle at 6 r.p.m.

The emulsion containing the vat dye particles may be applied in any conventional manner. For example, in dyeing textiles it may be padded or otherwise applied to the cloth at temperatures of from about 60° F. to about 110° F., and thereafter the coth dried, for example, in a hot flue drier. The wet pick up of the cloth may be from about 55% to 80% by weight based on the dry weight of the cloth, preferably from about 65% to 70%.

The color in the dyed cloth is developed conventionally. For example, the dyed textile may be passed through a padding bath containing alkali and alkali metal hydrosulfite at a temperature of about 90° F. After squeezing, the cloth is passed through a steam ager where the cloth is subjected to steam, free of oxygen, for about 15 to 30 seconds. Thereafter, the cloth is rinsed with cold water and oxidized at about 160° F. for about 25 to 30 seconds in a bath containing sodium bichromate and acetic acid. The cloth is thereafter rinsed thoroughly with water and then subjected to an alkaline soaping treatment; for example, it may be passed through one or two baths of hot water, at about 180° F., containing soap and soda ash. The cloth is thereafter rinsed with hot water at 160° F., squeezed and dried.

The following examples are given for purposes of illustrating the invention. It will be understood, however, that the invention is not limited to these examples.

*Example I*

Using an Eppenbach homogenizer, a slurry containing 20 parts of sodium alginate and about 180 parts of glycerin was dissolved in 1450 parts of water. 200 parts of a 15% aqueous solution of ammonium caseinate was then dissolved in the solution. To this solution was added 75 parts of glycerin and 5 parts of 2-ethylhexanol.

The resultant stock solution is referred to as concentrate #1.

5 gallons of concentrate #1 were dissolved in 50 gallons of water. To this solution, while agitating in an Eppenbach homogenizer, was added a mixture of the following vat dyes having an average particle size of approximately 60 to 80 microns in the proportions indicated:

| | Ounces per gallon |
|---|---|
| Vat Olive TR (Color Index No. 69525/6) | 4.3 |
| Vat N. Blue BRP (Color Index 51890) | 2.2 |
| Vat Brown BR (Color Index 70800/1) | .45 |

A dispersion of the vat dyes in the solution above described was thus produced.

This dispersion was then mixed in an Eppenbach homogenizer with 45 gallons of mineral spirits (Varsol #1). 100 gallons of oil-in-water emulsion having the vat dye particles dispersed in the outer phase resulted.

The emulsion thus produced was applied to 80 sq. cotton print cloth, by passing the cloth through a padder, thus applying approximately 65% of the emulsion, i.e., the cloth pick up was 65% based on the dry weight of the cloth. The cloth was then dried in a hot flue drier, and passed through a padding bath at 90° F. containing 2 ounces of caustic soda and 2½ ounces of sodium hydrosulfite per gallon of solution. The dyed cloth was then passed through a steam ager where it was subjected to steam free of oxygen for about 20 seconds. It was then rinsed with cold water and passed through a bath at 160° F. containing ½ ounce per gallon of sodium bichromate and 1 ounce per gallon of acetic acid (83% concentration). The cloth was then rinsed several times and passed through a bath at 180° F. containing approximately ¼ ounce per gallon of soap and ½ ounce per gallon of soda ash. The cloth was then rinsed with water at 160° F., squeezed and dried by passing over steam cans. An eminently satisfactory cloth, dyed a charcoal color, resulted.

For purposes of comparison, the same dyestuff in the same relative amounts under the same conditions, except that the vat dyestuff was not emulsified, was applied in the conventional manner to the same 80 sq. print cloth. The resultant shade was at least 40% weaker in depth or color value as compared with the shade produced by the invention.

*Example II*

A charcoal dyeing was effected as follows: sodium alginate was dissolved in water to produce a solution containing 3.2% of sodium alginate. To this solution was added a solution containing 15% ammonium caseinate in the proportions of 90% sodium alginate solution and 10% ammonium caseinate solution. On a dry basis, the solution contained 2.88% sodium alginate and 1.5% ammonium caseinate; the rest was water. To 400 parts of this solution was added 75 parts of glycerin and 5 parts of ethylhexanol, producing a concentrate or stock solution. This concentrate was diluted with water in a ratio of 10 parts water to 1 part concentrate. In the resultant solution were dispersed the vat dye particles having an average size of approximately 60 to 80 microns; the vat dye used in the mixture was Vat Olive T., Vat N Blue BRP and Vat Brown BR in amounts of 2.35, 1.1 and .225 ounces per gallon of concentrate. The resultant dispersion of the vat dye particles in the diluted concentrate was emulsified with mineral spirits (Varsol #1) in the proportion of 45 gallons of mineral spirits per 55 gallons of dilute concentrate. All mixing in this example was conducted in the Eppenbach homogenizer.

This emulsion was employed in dyeing cotton 80 sq. print cloth, exactly in the same way as in Example I, with excellent results.

Example III

This example differs from Example II chiefly in that a sodium soya bean proteinate in amount by weight of 1.5% on a dry basis was substituted for the ammonium caseinate. Otherwise, there was no change. The results were approximately the same.

Example IV

This example differs from Example I chiefly in that, in the preparation of the dispersion of the vat dye particles in the water solution of ammonium caseinate, an emulsifying agent in amount of .05% based on the weight of the emulsion was incorporated in the solution. The emulsifying agent used was sodium lauryl sulfate.

Example V 12 gallons of concentrate #1 produced as described in Example I were dissolved in 108 gallons of water. To this solution, while agitating in an Eppenbach homogenizer, was added a mixture of the following vat dyes having an average particle size of from 60 to 80 microns in the proportions indicated:

|  | Ounces per gallon |
|---|---|
| Khaki 2G Dbl. (Prototype 122) | 0.75 |
| Olive Green BD Dbl. (Prototype 293) | 0.21 |
| Olive T. Paste (Prototype 547) | 3.00 |
| Yellow GC (Prototype 9) | 0.41 |

A dispersion of these dyes in the solution above described was thus produced.

This dispersion was then mixed in an Eppenbach homogenizer with 80 gallons of mineral spirits (Varsol); 200 gallons of oil-in-water emulsion having the vat dye particles dispersed in the outer phase resulted. The emulsion thus produced was applied to 9 ounce combed Government sateen by padding involving two nips and two dips at 80° F. The thus dyed cloth was dried in a hot flue gas drier and passed through a padding bath containing a reducing solution of caustic soda and sodium hydrosulfite at 100° F. The dyed cloth was then steamed for 30 seconds at 216° F. It was then rinsed with cold water and oxidized with sodium bichromate and acetic acid at 160° F. Thereafter it was given a rinse with cold water and passed through a soap and soda ash bath at 160° F. The cloth was then rinsed with hot water and dried.

An eminently satisfactory vat olive green dyed cloth resulted.

For purposes of comparison, in order to obtain the same shade of vat olive green on the same 9 ounce combed Government sateen applying the same dyestuffs in the unemulsified condition, it was necessary to use the amounts of each of the dyestuffs indicated in the table which follows:

|  | Ounces per gallon |
|---|---|
| Khaki 2G Dbl. (Prototype 122) | 1.59 |
| Olive Green BD Dbl. (Prototype 293) | 0.37 |
| Olive T. Paste (Prototype 547) | 5.45 |
| Yellow GC (Prototype 9) | 0.78 |

Thus, it will be noted, the present invention involves a saving of approximately 50% of the amount of the dyestuff required to produce on the same cloth substantially the same shade. Thus the present invention results in a marked improvement in color value obtainable from a given amount of dyestuff.

It will be noted that the present invention provides a process of dyeing with vat dyes which results in a marked saving in amount of dyestuff required to produce a given shade and intensity of color.

Since certain changes may be made in carrying out the above described dyeing method without departing from the scope of the invention, it is intended that all matter contained in the above description shall be interpreted as illustrative and not in a limiting sense.

What is claimed is:

1. The process of dyeing fibrous material with vat dyes which comprises applying to the fibrous material an oil-in-water emulsion, the inner phase of which consists essentially of a volatilizable hydrocarbon oil and the outer water phase of which has dispersed therein vat dye particles having an average particle size of from 20 to 100 microns, said outer water phase having dissolved therein from 0.075% to 2.25% of a water-soluble compound from the group consisting of caseinates, soya bean proteinates and mixtures thereof based on the weight of the emulsion, said emulsion containing from 25% to 45% of the volatilizable hydrocarbon oil and from 55% to 75% of the outer water phase, the amount of said emulsion applied to the fibrous material being such that the fibrous material has a wet pickup of from 55% to 80% by weight based on the dry weight of the fibrous material, and thereafter drying and treating the dried fibrous material containing said emulsion to develop the color and thus effect dyeing of said fibrous material.

2. The dyeing process defined in claim 1, in which the particle size of the vat dye particles is from 60 to 80 microns.

3. The dyeing process defined in claim 1, in which the outer phase also contains from 2.4% to 3% sodium alginate based on the weight of the emulsion.

4. The process of dyeing fabrics with vat dyes which comprises padding the fabrics with an oil-in-water emulsion, the inner phase of which consists essentially of a volatilizable hydrocarbon oil and the outer water phase of which has dispersed therein vat dye particles having an average particle size of from 20 to 100 microns, said outer water phase having dissolved therein from 0.075% to 2.25% of a water-soluble compound from the group consisting of caseinates, soya bean proteinates and mixtures thereof based on the weight of the emulsion, said emulsion containing from 25% to 45% of the volatilizable hydrocarbon oil and from 55% to 75% of the outer water phase, the amount of said emulsion padded onto the fabrics being such that the fabrics have a wet pickup of from 55% to 80% by weight based on the dry weight of the fabrics, and thereafter drying the fabric and treating the dried fabric to develop the color and thus effect the dyeing of said fabric.

5. The dyeing process defined in claim 1, in which the particle size of the vat dye particles is from 60 to 80 microns, and in which the outer phase of said emulsion contains from 2.4% to 3% sodium alginate based on the weight of the emulsion.

6. An oil-in-water vat dyeing emulsion consisting essentially of vat dye particles having an average particle size of from 20 to 100 microns dispersed in a water solution of a water-soluble compound selected from the group consisting of water-soluble caseinates, water-soluble soya bean proteinates, and mixtures thereof, the outer phase of said emulsion containing from 0.075% to 2.25% of said water-soluble compound based on the weight of the emulsion, the inner phase of said emulsion consisting of from 25% to 45% by weight of a volatilizable hydrocarbon oil, and the outer phase of from 55% to 75% of said water solution having the vat dye particles dispersed therein.

7. An oil-in-water vat dyeing emulsion as defined in claim 6, in which the outer phase also contains from 2.4% to 3% by weight of sodium alginate based on the weight of the emulsion.

References Cited in the file of this patent

UNITED STATES PATENTS

| 2,635,942 | Thummel | Apr. 21, 1953 |
| 2,828,180 | Sertorio | Mar. 28, 1958 |
| 2,878,096 | Wood et al. | Mar. 17, 1959 |
| 2,883,258 | Spitzer et al. | Apr. 21, 1959 |